United States Patent [19]

Thoren

[11] Patent Number: 5,649,369
[45] Date of Patent: Jul. 22, 1997

[54] METHOD OF AND DEVICE FOR MEASURING THE BLADE CLEARANCE OF THERMAL TURBOMACHINES

[75] Inventor: Kjell Thoren, Finspong, Sweden

[73] Assignee: Asea Brown Boveri AG, Baden, Switzerland

[21] Appl. No.: 553,030

[22] Filed: Nov. 3, 1995

[30] Foreign Application Priority Data

Jan. 21, 1995 [DE] Germany ............... 195 01 811.7

[51] Int. Cl.$^6$ ............................................. G01B 5/14
[52] U.S. Cl. ........................... 33/655; 33/833; 33/542.1
[58] Field of Search .................... 33/655, 832, 833, 33/836, 613, 542, 542.1, 544.4, 556, 559, 702

[56] References Cited

U.S. PATENT DOCUMENTS

| | | | |
|---|---|---|---|
| 1,639,494 | 8/1927 | Flanders | 33/655 |
| 2,164,339 | 7/1939 | Morgan. | |
| 3,849,893 | 11/1974 | Ormsby. | |
| 3,932,941 | 1/1976 | Ormsby. | |
| 4,395,827 | 8/1983 | Stowe et al. | 33/655 |
| 4,495,810 | 1/1985 | Tessarzik et al. | |
| 4,928,400 | 5/1990 | Schuh | 33/833 |
| 5,125,165 | 6/1992 | Gerhard | 33/832 |
| 5,144,753 | 9/1992 | Murphy | 33/836 |

FOREIGN PATENT DOCUMENTS

| | | |
|---|---|---|
| 0172766A1 | 2/1986 | European Pat. Off.. |
| 3738625C | 6/1992 | Germany. |
| 4215381A | 11/1993 | Germany. |

*Primary Examiner*—Christopher W. Fulton
*Attorney, Agent, or Firm*—Burns, Doane, Swecker & Mathis, L.L.P.

[57] ABSTRACT

In a device for measuring the radial blade clearance between the moving-blade tips (6) and the blade carrier (4) of thermal turbomachines with the use of a measuring needle (7) which is guided along in an opening (16) in the blade carrier (4), is accommodated by the blade carrier (4) in a seat (8), projects radially opposite the moving-blade tips (6) into the flow duct (17) and can be abraded, the measuring needle (7), at its end remaining in the blade carrier (4), is fastened to a flexible guide part (10) projecting from the machine, the other end of the guide part (10) being connected to components (11), for example a screwed socket or a hydraulic cylinder. The components (11) permit a linear movement of the guide part (10), which is surrounded outside the outer casing (5) by a flexible tube (12), and between outer casing (5) and blade carrier (4) by a rigid guide tube (14). The device is especially suitable for measuring the transient blade clearance.

9 Claims, 2 Drawing Sheets

METHOD OF AND DEVICE FOR MEASURING THE BLADE CLEARANCE OF THERMAL TURBOMACHINES

BACKGROUND OF THE INVENTION

1. Field of the Invention

The invention relates to a method of and a device for measuring the blade clearance between the moving-blade tips and the blade carrier of thermal turbomachines.

2. Discussion of Background

In thermal turbomachines, the gap losses between the rotating moving-blade tips of the rotor and the parts of the stator (blade carrier) which are opposite them have a great effect on the efficiency of the machine. The greater these gap losses, the lower the efficiency. Therefore, the aim is to keep the radial moving-blade clearance in turbines and compressors as small as possible during operation. On the other hand, however, contact or, in the extreme case, abrasion of the parts must be prevented, since that could cause generation of heat and severe damage to the machine. The blade tips wear until the abrasion is complete, hard contact often leading to an enlarged blade clearance.

In contrast, however, abrasive coatings are sometimes used in order to abrade excessively long blades at the tips with slight generation of heat. In this method, the blades cut into the "soft" surface until there is no longer any contact.

In order to achieve a small amount of radial clearance over the long term, the radial expansion of the stator and of the rotor must be accurately controlled by the design. Simultaneous and identical expansion of stator and rotor in both the transient and the stable state would be ideal. However, that is rarely the case in actual machines, for the rotor is usually more solid than the stator on account of the strength requirements. Since both the heat-transfer conditions and usually the material for both parts are the same, the rotor is therefore thermally substantially slower than the stator. The thermal expansions of rotor and stator differ in the way they vary over time, especially during start-up and stopping of the machine. The radial clearance in the stable state is determined by the smallest clearance in the transient state (pinch point). The blade clearance is at its smallest during hot start of the machine. However, the largest clearance in the transient state must always be smaller than a certain maximum value in order to avoid, for example, the pumping of the compressor or to prevent local overheating downstream of the turbine.

The performance of modern turbomachines is improving. This can be attributed in particular to improved blade-clearance control. The need to measure the actual blade clearance, especially the blade clearance in the transient state, is continually increasing.

The measurement of the blade clearance by means of a measuring needle which can be abraded has hitherto been the most widespread method. The needle is fitted into the stator (blade carrier) during the assembly of the machine and projects radially opposite the rotating blade tips into the flow duct. The length of the measuring needle and the location for accommodating the needle in the stator are measured and are thus known. During the operation of the turbomachine, the measuring needle wears on account of abrasion. The disadvantage with this prior art consists in the fact that only the smallest transient blade clearance during the time between the first start of the turbomachine and the shut-off and the removal of the measuring needle can be determined. The advantage of this method is the high accuracy.

In addition, modern methods for the "remote measuring" of the blade clearance are known, for example by means of X-radiation and electric sparks as well as the measurement of the electrical capacitance and inductance. Most of these methods, however, are costly and are difficult to handle at high temperatures. Furthermore, the space required limits the use of a plurality of measuring points. The measuring accuracy of these methods is restricted.

SUMMARY OF THE INVENTION

Accordingly, one object of the invention, in attempting to avoid all these disadvantages, is to provide a novel method of and an uncomplicated device for measuring the instantaneous radial blade clearance of thermal turbomachines in the transient and stable state, which method and device are simple to handle, require only a small amount of space, so that stages lying side by side can be measured, and have a high measuring accuracy.

According to the invention, in a device for measuring the radial blade clearance between the moving-blade tips and the blade carrier of thermal turbomachines with the use of a measuring needle which is guided along in an opening in the blade carrier, is accommodated by the blade carrier in a seat, projects radially opposite the moving-blade tips into the flow duct and can be abraded, this is achieved when the measuring needle, at its end remaining in the blade carrier, is fastened to a flexible guide part projecting from the machine, the other end of the guide part being connected to components which permit a linear movement of the guide part, and the guide part being surrounded outside the outer casing by a flexible tube, and between outer casing and blade carrier by a rigid guide tube.

In a method of measuring the radial blade clearance between the moving-blade tips and the blade carrier during the operation of thermal turbomachines with the use of a device as claimed in claim 1, first of all the measuring needle and the guide part are connected to one another outside the machine and are then put into the flexible tube and are pushed by means of the components through the flexible tube and the rigid guide tube until the measuring needle reaches the flow duct, the measuring needle being abraded by the moving-blade tips until it has reached its end position in the seat of the blade carrier, then the measuring needle together with the guide part is pulled out of the machine and is separated from the guide part, and its length is measured.

The advantages of the invention consist, inter alia, in the fact that the device is simple and therefore inexpensive, that it is safe to manipulate and requires only little space, so that the blade clearance can be measured without difficulty at blade stages lying side by side. In addition, the measuring method is very accurate and is suitable for measuring the actual blade clearance in both the stable and the transient operating state of the turbomachine.

It is especially expedient if the flexible guide part is made of axially rigid wire or cable and the measuring needle is releasably connected to the flexible guide part via an intermediate piece.

Finally, levers, screwed sockets, pneumatic cylinders or hydraulic cylinders are preferably used as components which permit a linear movement of the guide part.

Furthermore, it is advantageous if the rigid guide tube is of spherical design at the two ends, since sound sealing is thereby achieved.

In addition, it is expedient if the rigid guide tube is subdivided horizontally at least once. This allows for the different axial expansions of the casing and the blade carrier.

Furthermore, it is advantageous if, in the blade carrier, the diameter of the opening for the measuring needle is about 2 to 4 mm. These small values enable the opening to be left open for a short time if the old needle/guide-part pair is replaced by a new pair during the operation of the turbomachine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for understanding the invention are shown. The direction of flow of the working media is designated by arrows.

DESCRIPTION OF THE PREFERRED EMBODIMENTS

Figure 1:
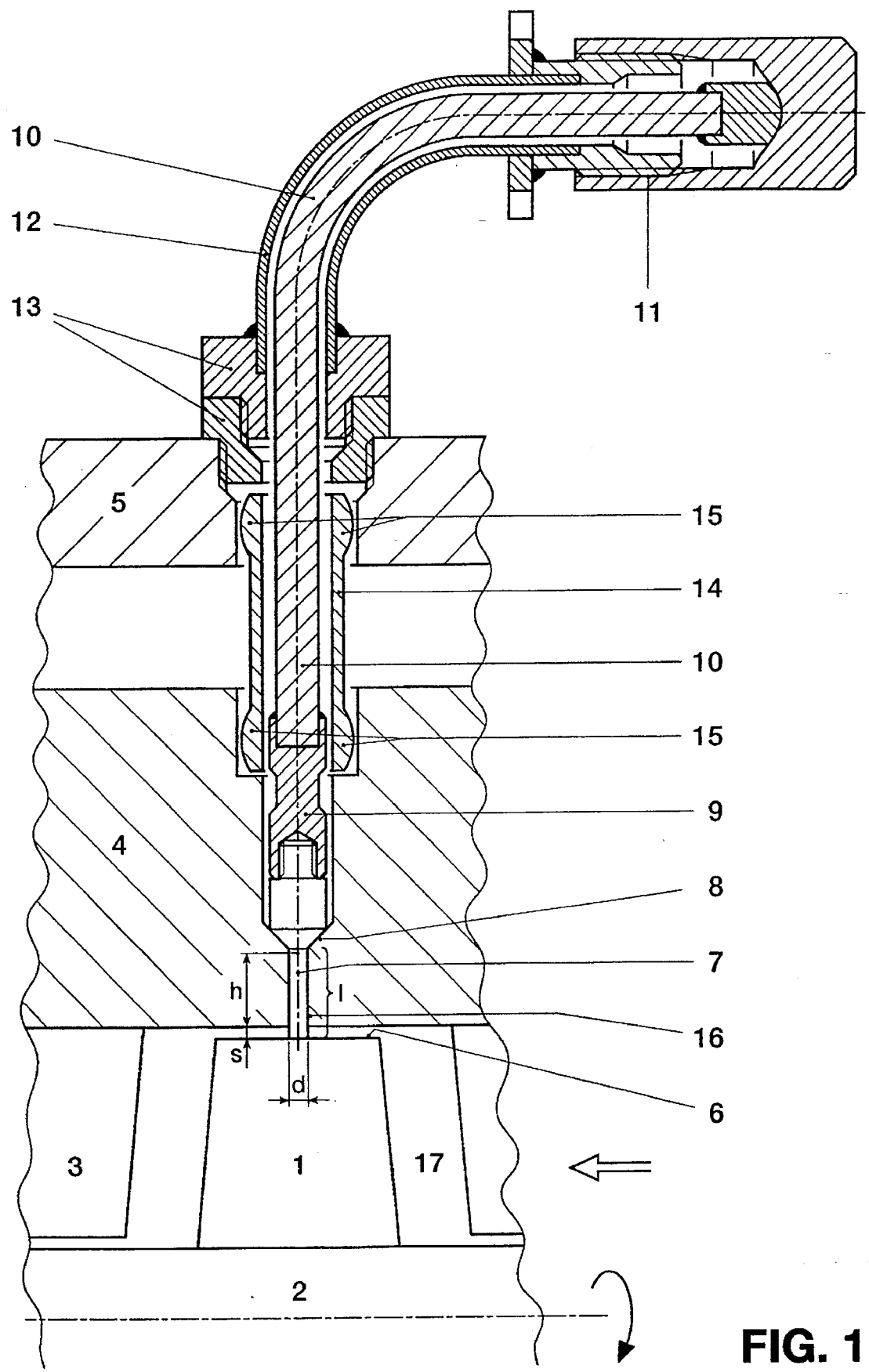
FIG. 1 shows a partial longitudinal section of the turbine in the area of the fitted measuring device according to the invention for determining the radial clearance when using a one-piece guide tube.

Referring now to the drawings, wherein like reference numerals designate identical or corresponding parts throughout the several views, FIG. 1 shows a partial longitudinal section of an axial-flow gas turbine in the area of the measuring device according to the invention. The gas turbine essentially comprises the rotor 2, equipped with moving blades 1, and the blade carrier 4 which is equipped with guide blades 3 and is hung in the turbine casing 5. Not shown in the drawing are, for example, the exhaust-gas casing adjoining the turbine casing, the inlet part of the turbine and the outer shell.

A measuring needle 7 known per se, which has, for example, the form shown in FIG. 1 having a tapering needle head, is used to measure the size of the blade clearance s between the rotating moving-blade tips 6 and the blade carrier 4. In this arrangement, the head shape of the needle 7 is adapted to the seat 8 in the blade carrier. The seat 8 and the needle head may, of course, also have a different shape and, for example, sit flatly one on top of the other in a horizontal plane. This seat 8, i.e. the receptacle for the measuring needle 7, is always located near the flow duct 17.

The measuring needle 7 is connected in an easily releasable manner to a flexible guide part 10 via an intermediate piece 9; in this case, it is screwed into the intermediate piece 9. In the present exemplary embodiment, the guide part 10 is a flexible wire. Other flexible materials sufficiently rigid with respect to axial pressure, such as, for example, cable, may also be used. The guide part 10 is connected at its other end to a component 11 which permits a linear movement of the guide part 10, i.e. the wire. The component 11 is a screwed socket in the present exemplary embodiment. Levers and hydraulic or pneumatic cylinders, for example, may likewise also be used for this purpose. A flexible tube 12, which may be made of metal for example, is arranged between the turbine casing 5 and the screwed socket 11. It is connected to the turbine casing 5 via inserts 13.

The flexible parts outside the machine may be produced from commercially available, axially rigid wire/tube combinations (Bowden cable).

A rigid guide tube 14 is arranged between outer casing 5 and blade carrier 4. It has a spherical shape at each of its two ends 15 and thereby ensures sound sealing.

Figure 3:
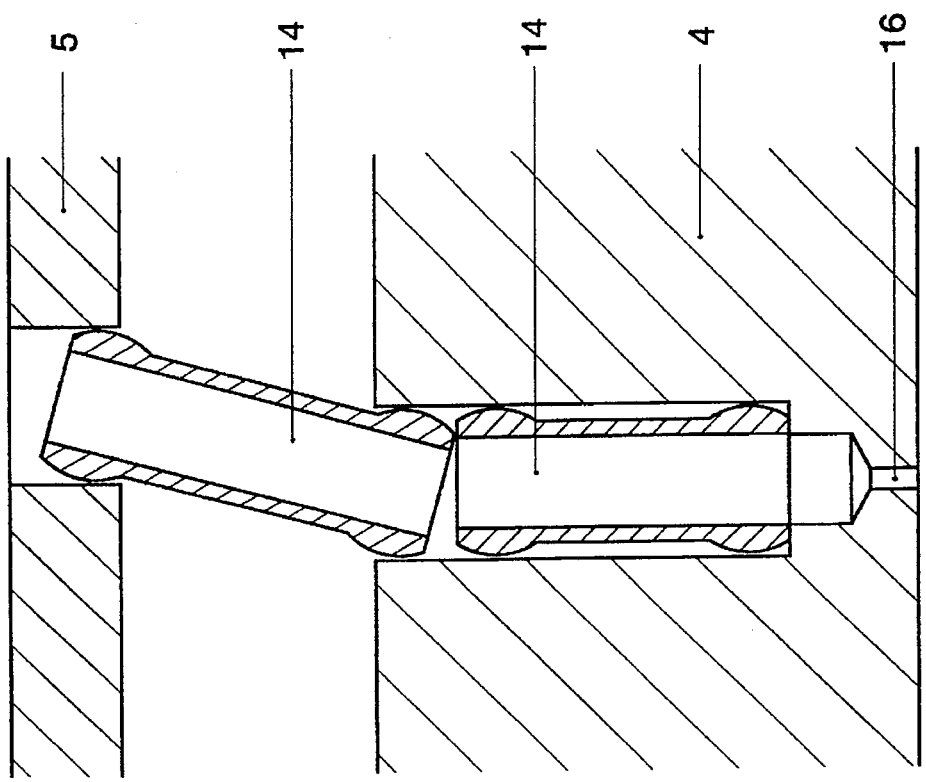
FIGS. 2, 3 each schematically show a partial longitudinal section in the area of the guide tube, which is divided horizontally.
Figure 2:
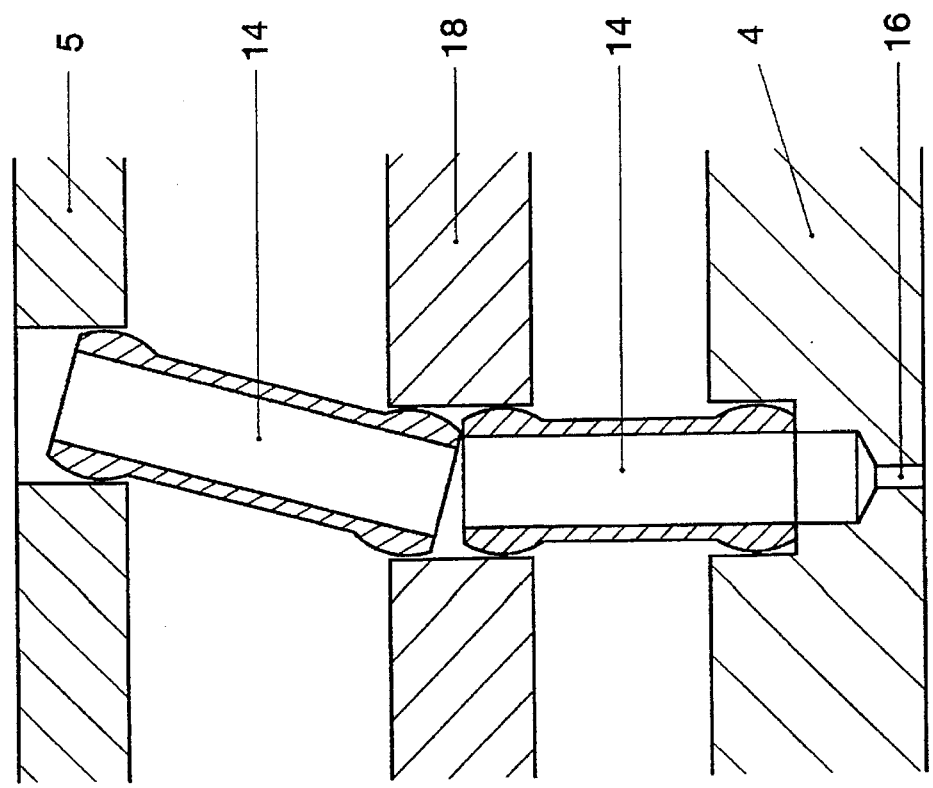

The rigid guide tube 14 can be divided horizontally several times. FIG. 2 and FIG. 3 show exemplary embodiments in which the guide tube 14 is divided horizontally once. According to FIG. 2, the dividing plane is located in the intermediate wall 18, which may be a heat shield for example. If a very thick blade carrier 4 is used, as shown in FIG. 3, the guide tube 14 is advantageously divided in the area of the blade carrier 4. In other exemplary embodiments not shown here, the guide tube 14 may, of course, also be designed to be divided horizontally more than once. The dividing of the guide tube 14 has the advantage that different expansions of the casing 5, of any intermediate wall 18 present and of the blade carrier 4 of the turbine do not present any problems as far as the measurements of the blade clearance s are concerned.

The diameter d of the opening 16 for the tip of the needle 7 in the blade carrier 4 is in the region of about 2 to 4 mm. This small diameter d enables the opening 16 to be left open for a time if the needle/guide-part pair has to be replaced by a new pair. The slight leakage of hot gas in this case is unimportant.

Since the device has only a small space requirement, it is also suitable for measuring the blade clearance of adjacent turbine stages.

To measure the radial blade clearance s between the moving-blade tips 6 and the blade carrier 4 during the operation of thermal turbomachines, first of all the measuring needle 7 and the guide part 10 are connected to one another outside the machine or outside the enclosure with the use of the device described above. The measuring needle 7 and the guide part 10 are then put into the flexible tube 12 and are pushed by means of the components 11 through the flexible tube 12 and the rigid guide tube 14 until the measuring needle 7 reaches the flow duct 17 through the opening 16, the measuring needle 7 being abraded by the moving-blade tips 6 until it has reached its end position in the seat 8 of the blade carrier 4. Then the measuring needle 7 together with the guide part 10 is pulled out of the machine and is separated from the guide part 10, and its length l is measured. Since the distance h of the needle seat from the flow duct 17 is known, the blade clearance s can simply be calculated from the difference l–h.

The method is especially well-suited for measuring the transient blade clearance. Here, the measurement described above is repeated within a few minutes by means of a plurality of measuring-needle/guide-part pairs.

The measuring accuracy of the method is very good; it is about +/−0.1 mm. The method cannot be affected by the pressure or the high temperatures. It can be carried out easily and safely, since the measuring instrument can be put in and removed outside the machine. In gas and steam turbines, the measuring method can be carried out conveniently and safely outside the outer shell (enclosure), which is a great advantage.

The necessary relative axial rigidity between the guide part 10 and the flexible tube 12 is not of very great importance, since only a small force is required to push the guide part 10 together with the needle 7 through the flexible tube 12 until it sits on the seat 8 (after corresponding wear/abrasion by the moving-blade tips 6).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for measuring the radial blade clearance between the moving-blade tips (6) and the blade carrier (4) of thermal turbomachines with the use of a measuring needle (7) which is guided along in an opening (16) in the blade carrier (4), is accommodated by the blade carrier (4) in a seat (8), projects radially opposite the moving-blade tips (6) into the flow duct (17) and can be abraded, wherein the measuring needle (7), at its end remaining in the blade carrier (4), is fastened to a flexible guide part (10) projecting from the machine, the other end of the guide part (10) being connected to components (11) which permit a linear movement of the guide part (10), and the guide part (10) being surrounded outside the outer casing (5) by a flexible tube (12), and between outer casing (5) and blade carrier (4) by a rigid guide tube (14).

2. The device as claimed in claim 1, wherein the flexible guide part (10) is made of a material, preferably wire or cable, which is sufficiently rigid with respect to the axial pressure.

3. The device as claimed in claim 1, wherein the measuring needle (7) is connected to the flexible guide part (10) via an intermediate piece (9).

4. The device as claimed in claim 1, wherein the components (11) are preferably levers, screwed sockets, pneumatic cylinders or hydraulic cylinders.

5. The device as claimed in claim 1, wherein the rigid guide tube (14) is of spherical design at its two ends (15).

6. The device as claimed in claim 5, wherein the rigid guide tube (14) is subdivided horizontally at least once.

7. The device as claimed in claim 1, wherein the diameter (d) of the opening (16) for the tip of the measuring needle (7) is about 2 to 4 mm.

8. A method of measuring the radial blade clearance between the moving-blade tips (6) and the blade carrier (4) during the operation of thermal turbomachines with the use of a device as claimed in claim 1, wherein first of all the measuring needle (7) and the guide part (10) are connected to one another outside the machine, the measuring needle (7) and the guide part (10) are then put into the flexible tube (12) and are pushed by means of the components (11) through the flexible tube (12) and the rigid guide tube (14) until the measuring needle (7) reaches the flow duct, the measuring needle (7) being abraded by the moving-blade tips (6) until it has reached its end position in the seat (8) of the blade carrier (4), and then the measuring needle (7) together with the guide part (10) is pulled out of the machine and is separated from the guide part (10), and the length (l) of its tip is measured.

9. The method as claimed in claim 8, wherein the transient blade clearance is measured, the measurement being repeated within a few minutes by means of a plurality of measuring-needle/guide-part pairs.

* * * * *